Figure 1:
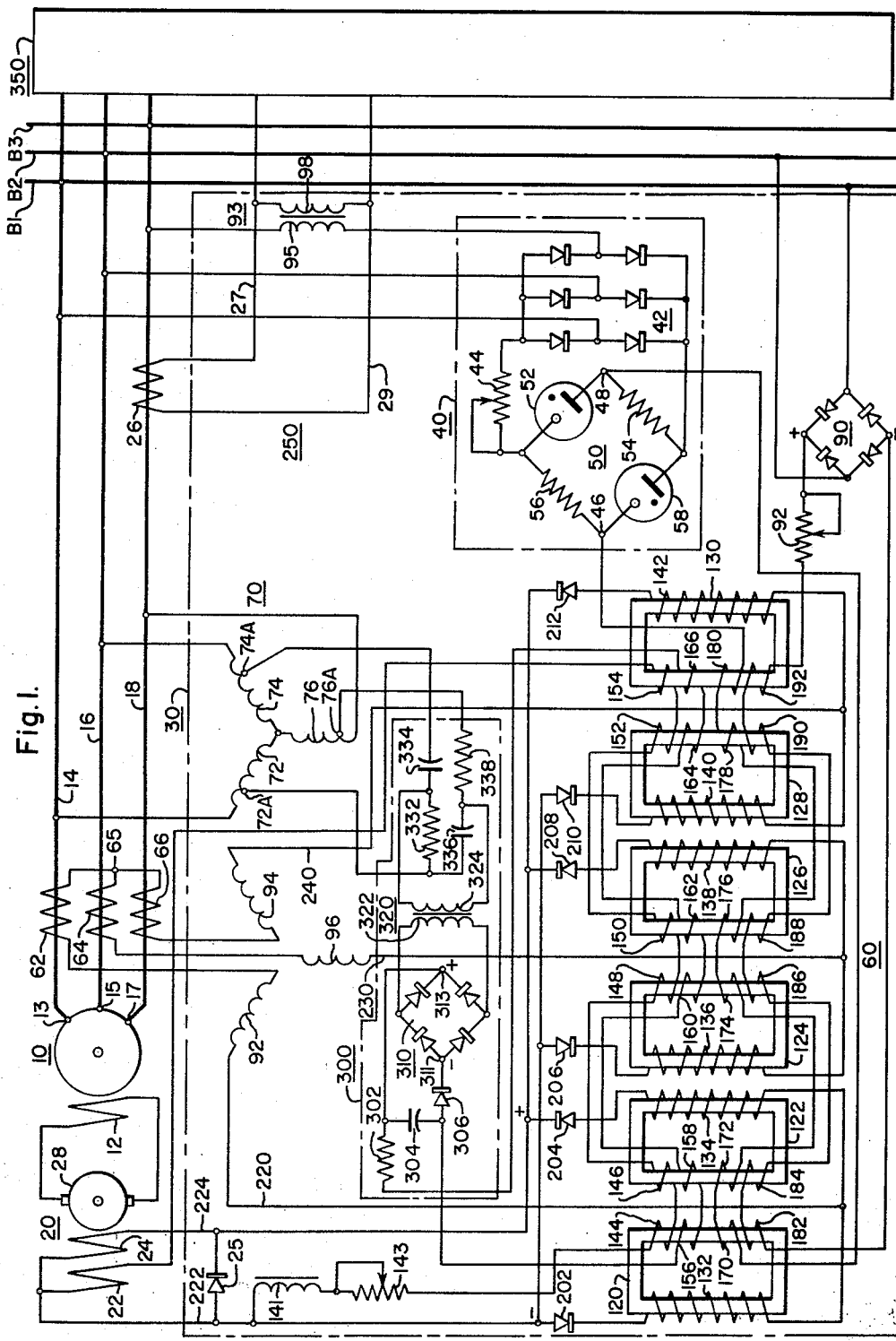

Nov. 14, 1961 G. H. STEARLEY ET AL 3,009,090
REGULATOR SYSTEM FOR GENERATORS
Filed March 27, 1959 2 Sheets-Sheet 2

WITNESSES:
Bernard R. Gieguey
Clement L. McHale

INVENTORS
George H. Stearley and
Ralph D. Jessee.
BY
F. E. Browder
ATTORNEY

United States Patent Office 3,009,090
Patented Nov. 14, 1961

3,009,090
REGULATOR SYSTEM FOR GENERATORS
George H. Stearley and Ralph D. Jessee, Lima, Ohio, assignors to Westinghouse Electric Corporation, East Pittsburgh, Pa., a corporation of Pennsylvania
Filed Mar. 27, 1959, Ser. No. 802,541
9 Claims. (Cl. 322—17)

This invention relates to electrical control apparatus and, more particularly, to regulator systems for use with dynamoelectric machines, such as generators.

Many conventional types of regulator systems have been provided in the past for maintaining the average value of the phase voltages of an alternating current power system at a predetermined value. Such regulator systems are therefore arranged to respond to the average value of the phase voltages of a polyphase electrical power system. The operation of a regulator system which responds to the average value of the phase voltages of a polyphase electrical power system may be satisfactory during normal operating conditions, when the load currents being carried by the different phases of the system are reasonably balanced or balanced within a predetermined limit, but has definite disadvantages during certain abnormal operating conditions. For example, if a fault or abnormal operating condition should occur on one phase of a polyphase electrical power system supplying a number of single phase loads, the different phase voltages of the polyphase system may become quite unbalanced for certain values of line-to-neutral fault impedances. If a regulator system used with an electrical polyphase power system during the latter operating condition responds to the average value of the phase voltages of said electrical power system, the operation of the regulator system may cause the phase voltage on one phase to rise to an excessisve value while the voltage on a second phase remains near the regulated value and the voltage on the faulted phase is reduced to a low value. During an operating condition of the type described, a conventional regulator system may therefore cause damage to the single phase load which is connected to the phase of a polyphase system which is subjected to an excessive voltage while a different phase of the same system is subjected to a fault or abnormal operating condition. It is therefore desirable to provide a regulator system for maintaining the average value of the phase voltages of a polyphase electrical power system at a predetermined value so long as the degree of unbalance of the phase voltages of said system is below a predetermined limit and for preventing excessisve phase voltages when the degree of unbalance of the phase voltages of said system exceeds said predetermined limit. It is also desirable that a regulator system of the type described lend itself to convenient control of reactive load division when the associated dynamoelectric machine is operating in parallel with similar units. It is also desirable that a regulator system of the type described provide sufficient excitation to the associated dynamoelectric machine under abnormal operating conditions so that the output of said machine is sufficient to actuate associated protective equipment.

It is an object of this invention to provide a new and improved regulator system for a dynamoelectric machine, such as a polyphase synchronous generator.

Another object of this invention is to provide a new and improved regulator system for maintaining the average value of the output phase voltages of a dynamoelectric machine at substantially a predetermined value during normal operating conditons and for limiting the highest phase voltage of said machine during certain abnormal operating conditions.

A further object of this invention is to provide a regulator system for maintaining the average value of the output phase voltages of a polyphase dynamoelectric machine at substantially a predetermined value when the degree of unbalance of the output phase voltages of said machine is below a predetermined limit and for limiting the highest phase voltage when the degree of unbalance of said phase voltages exceeds said predetermined limit.

A still further object of this invention is to provide a regulator system for maintaining the average value of the phase voltages of a polyphase alternating current circuit at substantially a predetermined value when the negative sequence voltage of said circuit is below a predetermined value and for limiting the highest phase voltage of said circuit when the negative sequence voltage of said circuits exceeds said predetermined value.

A more specific object of this invention is to provide the regulator system for controlling the excitation supplied to an associated dynamoelectric machine, such as a polyphase synchronous generator, which responds to the positive sequence output voltage of said machine so long as the negative sequence voltage of said machine is below a predetermined value and which responds to a combination of the positive sequence voltage and the negative sequence voltage when the negative sequence voltage exceeds said predetermined value.

Other objects of the invention will, in part, be obvious and will, in part, appear hereinafter.

Figure 2:
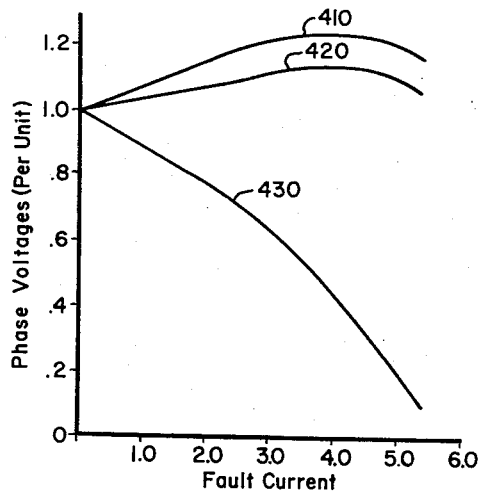
Figure 3:
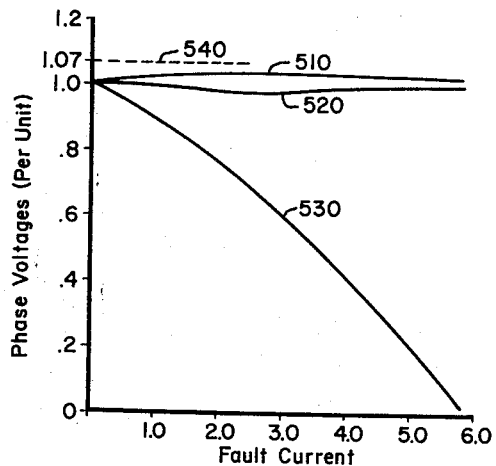
Figure 4:
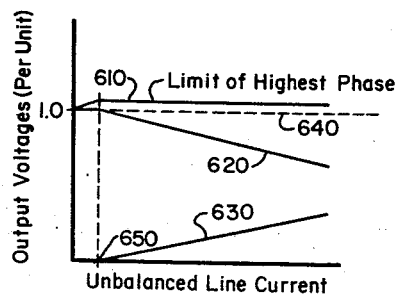

For a fuller understanding of the nature and objects of the invention, reference should be had to the following detailed description taken in connection with the accompanying drawing, in which:

FIGURE 1 is a schematic circuit diagram showing an illustrative embodiment of the invention; and FIGS. 2, 3 and 4 show curves illustrating the principles of the invention.

Referring now to the drawing, there is illustrated a dynamoelectric machine, more specifically a synchronous generator 10, having an excitation field winding 12 and output terminals 13, 15 and 17. In this instance the generator 10 is disposed to supply polyphase electric power through the output terminals 13, 15 and 17 and through the line conductors 14, 16 and 18, respectively, to a load (not shown) connected at the bus conductors B1, B2 and B3, respectively, which are part of a three phase electrical power system. In order to obtain an excitation voltage across the field winding 12 of a relatively large magnitude, an exciter 20 is provided. The generator 10 and exciter 20 are both driven by a suitable prime mover (not shown). In this instance, the exciter 20 comprises an armature 28, which supplies excitation current to the field winding 12 of the generator 10, a main excitation field winding 24 and an additional or auxiliary field winding 22, whose purpose will be discussed hereinafter. The excitation current supplied to the excitation field winding 24 of the exciter 20 is provided by a first transformer means 70 which is responsive to the output voltage of the generator 10 and a second transformer means, comprising the current transformers 62, 64 and 66, which is responsive to the output current of the generator 10.

In order to maintain the output voltage of the synchronous generator 10 at substantially a predetermined regulated value, a regulator system 30 is connected between the first and second transformer means and the excitation field winding 24 of the exciter 20. During normal operating conditions, when the output phase voltages at the output terminals 13, 15 and 17 of the generator 10 are unbalanced to a degree below a predetermined limit, the regulator system 30 is responsive to the average value of the phase voltages at said terminals or responsive to the positive sequence voltage of the phase voltages at said terminals. During certain abnormal operating conditions when the phase voltages at the output terminals 13, 15 and 17 of the generator 10 become unbalanced to a degree in excess of a predetermined limit, the unbalanced voltage detecting circuit or negative sequence sensing circuit 300 is connected in circuit relation with the first and second transformer means and the regulator system 30 to limit the excitation current supplied to the generator 10 and to limit the highest phase voltage at the output terminals 13, 15 and 17 of said generator.

In general, the regulator system 30 comprises an error detecting circuit 40 for producing a direct current error signal or voltage which is a measure of the deviation of the average value of the output phase voltages of the synchronous generator 10 from a reference voltage or from its regulated value and control means, specifically a magnetic amplifier 60, for producing an output excitation current which varies with the error signal from the error detecting circuit 40 and which is applied to the field winding 24 of the exciter 20. The regulator system 30 operates during normal operating conditions to provide excitation current to the field winding 12 of the generator 10 from the first and second transformer means which is varied in accordance with the average value of the output phase voltages of the generator 10 or in accordance with the positive sequence voltage at the output terminals of the generator 10 in order to maintain said average value or positive sequence voltage of the generator 10 at substantially a predetermined regulated value.

In this instance, the error detecting circuit 40 comprises a well known bridge circuit 50, a rheostat 44 and a three-phase, full wave rectifier 42. The input of the full wave rectifier 42 is connected to be responsive to the average value of the output phase voltages of the generator 10 at the line conductors 14, 16 and 18. It is to be noted that the line conductor 18 is connected to one input terminal of the rectifier 42 through a winding 95 of a mutual reactor 93, whose purpose will be discussed hereinafter. It is to be understood that a potential transformer may be interposed between the input terminals of the rectifier 42 and the conductors 14, 16 and 18, where required in a particular application. The output of the full wave rectifier 42 is connected across the input terminals of the bridge circuit 50 through the rheostat 44. The bridge circuit 50 includes two parallel branches, a first branch comprising the resistor 56 connected in series circuit relationship with the voltage regulating tube 58 and a second branch comprising the voltage regulating tube 52 and the resistor 54 connected in series circuit relationship. The voltage regulating tubes 52 and 58 may be of the gas discharge type but it is to be understood that semiconductor diodes preferably of the type known to the art as Zener diodes, may be substituted for said tubes. The output voltage or signal of the error detecting circuit 40 appears at the output terminals 46 and 48 of the bridge circuit 50.

In the operation of the error detecting circuit 40, the direct current output voltage of the full wave rectifier 42 is a direct current measure of the average value of the phase voltages at the output terminals 13, 15 and 17 of the generator 10 or of the positive sequence voltage at said output terminals. The rheostat 44 is provided in order to vary the portion of the output voltage of the full wave rectifier 42 that is applied to the input terminals of the bridge circuit 50. During operation, the direct current voltage across each of the voltage regulating tubes 52 and 58 remains substantially constant since the voltage applied to each of the tubes 52 and 58 is always of a greater magnitude than the breakdown voltage of each of said tubes. It will be seen that when a direct current voltage is applied at the input terminals of the bridge circuit 50 which is substantially equal to twice the voltage drop across each of the tubes 52 and 58, there will be no voltage difference existing across the output terminals 46 and 48 of the error detecting circuit 40. When, however, the voltage across the input terminals of the bridge circuit 50 is either above or below the reference voltage of the bridge circuit 50, which is twice the voltage drop across each of the tubes 52 and 58, then a voltage difference will result or exist across the output terminals 46 and 48 of the error detecting circuit 40. The polarity of the output voltage or signal of the error detecting circuit 40 at the terminals 46 and 48 will depend upon whether the input voltage is above or below the reference voltage of the bridge circuit 50. In the normal range of operation of the regulating system 30, as illustrated, the polarity of output voltage from the error detecting circuit 40 applied to the magnetic amplifier 60 may reverse in a particular application. The rheostat 44 is adjusted initially to obtain the desired magnitude and polarity of the output error voltage from the error detecting circuit 40. The setting of the rheostat 44 may also be changed to adjust the regulated value of voltage at which the regulator system 30 maintains the average value of the output phase voltages at the output terminals 13, 15 and 17 of the generator 10 during normal operation.

As hereinbefore mentioned, three-phase magnetic amplifier 60 is responsive during normal operating conditions to the output signal of the error detecting circuit 40 or the average value of the output phase voltages at the output terminals 13, 15 and 17 of the generator 10 in controlling the excitation current supplied to the excitation field winding 24 of the exciter 20 from the first transformer means 70 and a second transformer means comprising the current transformers 62, 64 and 66. As illustrated the magnetic amplifier 60 comprises the magnetic core members 120, 122, 124, 126, 128 and 130 which have disposed in inductive relationship therewith, the load windings 132, 134, 136, 138, 140 and 142, respectively. In this instance the load windings 132, 134, 136, 138, 140 and 142 have connected in series circuit relationship therewith, the self-saturating rectifiers 202, 204, 206, 208, 210 and 212 respectively, in order to insure that current flows in only one direction through the respective load windings. As illustrated, the load windings 132, 136 and 140 are so connected to a conductor 222 and the load windings 134, 138 and 142 are so connected to a conductor 224 that the output current of the magnetic amplifier 60 flows in only one direction through the field winding 24 of the exciter 20. A commutating rectifier 25 is electrically connected across the field winding 24 of the exciter 20 for commutating the current through the field winding 24. In other words, the rectifier 25 discharges the field winding 24 cyclically, thus preventing the flow of unwanted feedback into the load windings 132, 134, 136, 138, 140 and 142 which would otherwise render the magnetic amplifier 60 unstable.

In order to apply a three-phase voltage to the load windings 132, 134, 136, 138, 140 and 142 of the magnetic amplifier 60, the three phase potential transformer 70 which is responsive to the output voltage of the generator 10 and the current transformers 62, 64 and 66 which are responsive to the output current of said generator are so interconnected as to produce a combined three-phase output voltage at the conductors 220, 230 and 240. In particular, the primary phase windings 72, 74 and 76 of the transformer 70 are Y connected to the line conductors 14, 16 and 18 respectively. The current transformers 62, 64 and 66 are disposed adjacent to and in inductive relationship with the line conductors 14, 16 and 18, respectively, and the output voltage from said current transformers varies with or is responsive to the output current from the generator 10 which flows in the respective line conductors. The transformer 70 also includes three secondary phase windings 92, 94 and 96, one end of each of said secondary phase windings being connected to the neutral terminal 65 through one of the associated current transformers 62, 66 and 64, respectively. The other end of the secondary phase windings 92, 94 and 96 are connected to the output conductors 220, 240 and 230, respectively. The three-phase output voltage at the conductors 220, 230 and 240 is applied to the load windings of the magnetic amplifier 60 by connecting said conductors to the lower junction points of the load windings 132 and 134, 136 and 138, and 140 and 142, respectively, as shown in FIG. 1 of the drawing.

In order to bias the magnetic amplifier 60 by a predetermined amount, the magnetic core members 120, 122, 124, 126, 128 and 130 have disposed in inductive relationship therewith, the biasing windings 182, 184, 186, 188, 190 and 192, respectively. As illustrated, the biasing windings 182, 184, 186, 188, 190 and 192 are connected in series circuit relation with one another through a rheostat 92 across the output terminals of a full wave, dry-type rectifier 90 whose input terminals are electrically connected to the bus conductors B1 and B2 for receiving energy therefrom. The biasing windings 182, 184, 186, 188, 190 and 192 are so disposed on their respective magnetic core members that current flow therethrough produces flux which opposes the flux produced by the current flow through the associated load windings 132, 134, 136, 138, 140 and 142, respectively.

For the purpose of saturating the magnetic core members 120, 122, 124, 126, 128 and 130 in accordance with the output error signal from the error detecting circuit 40, the control windings 170, 172, 174, 176, 178 and 180 are disposed in inductive relationship with the core members 120, 122, 124, 126, 128 and 130, respectively. As illustrated, the control windings 170, 172, 174, 176, 178 and 180 are so disposed on their respective core members that current flow therethrough produces flux which opposes or aids the flux produced by the current through the associated biasing windings 182, 184, 186, 188, 190 and 192, respectively, depending upon the amount of bias provided by said bias windings. In this instance, the control windings 170, 172, 174, 176, 178 and 180 are connected in series circuit relationship, the series circuit being connected across the output terminals 46 and 48 of the error detecting circuit 40.

In order to improve the stability of the regulator system 30 the magnetic core members 120, 122, 124, 126, 128 and 130 have disposed in inductive relationship therewith the negative feedback or damping windings 144, 146, 148, 150, 152 and 154, respectively. As illustrated, the feedback windings 144, 146, 148, 150, 152 and 154 are connected in series circuit relationship with one another, the series circuit being connected across the auxiliary or stabilizing field winding 22 through the reactor 141 and the variable resistor 143. The stabilizing field winding 22 is disposed in inductive relationship with the main excitation field winding 24 of the exciter 20 to provide a stabilizing or negative feedback signal which varies with the rate of change of the voltage across the main excitation field winding 24 of the exciter 20. The reactor 141 and the resistor 143 are provided in order to control the time constant of the feedback signal which is applied to the feedback or damping windings 144 through 154 of the magnetic amplifier 60. The feedback windings 144, 146, 148, 150, 152, and 154 are so disposed on their respective core members that current flow therethrough produces flux which opposes the flux produced by the current flow through the associated control windings 170, 172, 174, 176, 178 and 180, respectively. The current flow through said feedback windings varies, of course, with the feedback signal supplied from the stabilizing winding 22 of the exciter 20.

For a purpose which will be discussed hereinafter, the magnetic core members 120, 122, 124, 126, 128 and 130 have disposed in inductive relationship therewith the limiting windings 156, 158, 160, 162, 164 and 166, respectively. As illustrated the limiting windings 156, 158, 160, 162, 164 and 166 are connected in series circuit relationship with one another, the series circuit being connected across the output of the unbalanced voltage detecting circuit 300. The limiting windings 156, 158, 160, 162, 164 and 166 are so disposed on their respective core members that current flow therethrough produces flux which opposes the flux produced by the current flow through the associated control windings 170, 172, 174, 176, 178 and 180, respectively.

The manner in which the load windings 132, 134, 136, 138, 140 and 142 of the magnetic amplifier 60 receive energy from the potential transformer 70 which includes the secondary phase windings 92, 94 and 96 and from the current transformers 62, 64 and 66 can be better understood by tracing the current flow through the load windings during various phases of the output voltage of the transformer 70. Assuming that the right end of the secondary phase winding 92 of the transformer 70 is at a positive polarity with respect to the left end of the winding 92, then current flows from the right end of the winding 92 through the current transformer 62, the current transformer 64, the secondary phase winding 96, through the conductor 230, through the load winding 138 and the self-saturating rectifier 208 to the conductor 224, through the field winding 24 of the exciter 20, the conductor 222, the self-saturating rectifier 202, the load winding 132 and back to the left end of the secondary phase winding 92 through the conductor 220. When the right end of the secondary phase winding 92 is at a positive polarity with respect to the left end of the winding 92, current also flows from the right end of the winding 92 through the current transformer 62, the current transformer 66, the secondary phase winding 94, through the conductor 240, the load winding 142, the self-saturating rectifier 212, the conductor 224, the field winding 24 of the exciter 20, the conductor 222, the self-saturating rectifier 202, the load winding 132 and back to the left end of the winding 92 through the conductor 220.

During the next phase of the output voltage of the transformer 70 in which the upper end of the secondary phase winding 96 is at a positive polarity with respect to the lower end of the winding 96, current flows from the upper end of the winding 96 through the current transformer 64, the current transformer 62, the secondary phase winding 92, the conductor 220, the load winding 134, the self-saturating rectifier 204, the conductor 224, the field winding 24 of the exciter 20, the conductor 222 the self-saturating rectifier 206, the load winding 136 and back to the lower end of the winding 96 through the conductor 230. When the upper end of the secondary phase winding 96 is at a positive polarity with respect to the lower end of said winding, current also flows from the upper end of said winding through the current transformer 64, the current transformer 66, the secondary phase winding 94 the conductor 240, the load winding 142 the self-saturating rectifier 212, the conductor 224, the field winding 24 of the exciter 20, the conductor 222 the self-saturating rectifier 206, the load winding 136 and back to the lower end of the winding 96 through the conductor 230.

During the next phase of the output voltage of the transformer 70 in which the left end of the secondary phase winding 94 is at a positive polarity with respect to the right end of the winding 94, current flows from the left end of said winding through the current transformer 66, the current transformer 64, the secondary phase winding 96, the conductor 230, the load winding 138, the self-saturating rectifier 208, the conductor 224, the field winding 24 of the exciter 20, the conductor 222, the self-saturating rectifier 210, the load winding 140 and back to the right end of the winding 94 through the conductor 240. When the left end of the secondary phase winding 94 is at a positive polarity with respect to the right end of said winding, current also flows from the left end of said winding through the current transformer 66, the current transformer 62, the secondary phase winding 92, the conductor 220, the load winding 134, the self-saturating rectifier 204, the conductor 224, the field winding 24 of the exciter 20, the conductor 222, the self-saturating rectifier 210, the load winding 140 and back to the right end of the secondary phase winding 94 through the conductor 240.

The operation of the regulator system 30 in the absence of the unbalanced voltage detecting circuit 300 and the associated limiting windings 156 through 166 of the magnetic amplifier 60 will now be described. In general, during normal operating conditions when the output phase voltages of the generator 10 are unbalanced to a degree below a predetermined limit, the regulator system 30 is responsive to the average value of the phase voltages at the output terminals 13, 15 and 17 of said generator to thereby maintain the average value of the output phase voltages of said generator at substantially a predetermined value.

In particular, the rheostat 44 of the error detecting circuit 40 is adjusted initially so that an output error signal or voltage appears at the output terminals 46 and 48 of the error detecting circuit 40 which is positive at the terminal 48 with respect to the voltage at the terminal 46. The error voltage or signal is also adjusted so as to be of a proper magnitude to cause an excitation current to appear at the output of the magnetic amplifier 60 which will cause an average value of excitation current to be applied to the excitation field winding 24 of the exciter 20 which will result in a desired value of regulated voltage at the output terminals 13, 15 and 17 of the generator 10. The latter value is the average value of the output phase voltages of the generator 10 at the output terminals 13, 15 and 17. After the rheostat 44 has been adjusted for the desired regulated average value of the output phase voltages at the output terminals of the generator 10, any change in the average value of the output phase voltages of the generator 10 will result in a change in the output error signal or voltage of the error detecting circuit 40 which appears at the terminals 46 and 48. For example, if the average value of the output phase voltages of the generator 10 should start to drop below the desired regulated value, the output error voltage of the error detecting circuit 40 at the terminals 46 and 48 will vary as the average value of the output phase voltages of the generator 10 decreases. The effect of a changing voltage at the output terminals 46 and 48 of the error detecting circuit 40 is to change the magnitude or direction of the current flow through the control windings 170, 172, 174, 176, 178 and 180 of the magnetic amplifier 60. The change in magnitude or direction of the current flow to the control windings 170, 172, 174, 176, 178 and 180 changes the magnitude or direction respectively of the fluxes produced thereby in the core members 120, 122, 124, 126, 128, 130, respectively, which fluxes aid or oppose the fluxes produced in the respective core members by the current flow through the load windings 132, 134, 136, 138, 140 and 142, respectively, thereby increasing the output current of the magnetic amplifier 60. With an increase in the output current of the magnitude amplifier 60, the magnitude of the current flow through the field winding 24 of the exciter 20 also increases to thereby increase the voltage across the field winding 12 of the generator 10 and return the average value of the output phase voltages of the generator 10 to its regulated value.

On the other hand, if the average value of the output phase voltages of the generator 10 increases to a value above the desired regulated value, then the output voltage of the error detecting circuit 40 changes correspondingly and the magnitude of the current flow through the control windings 170, 172, 174, 176, 178 and 180 of the magnetic amplifier 60 also changes or the direction of said current reverses. A change in the magnitude of the current flow through the control windings 170, 172, 174, 176, 178, and 180 or a change in the direction of said current flow changes the magnitude or direction, respectively, of the fluxes produced thereby in the core members 120, 122, 124, 126, 128 and 130, respectively, which fluxes aid or oppose the fluxes produced in the respective core members by the current flow through the load windings 132, 134, 136, 138, 140 and 142, respectively, to thereby decrease the output of the magnetic amplifier 60. A decrease in the output current of the magnetic amplifier 60 decreases the magnitude of the current flow through the field winding 24 of the exciter 20 to thereby decrease the voltage across the field winding 12 of the generator 10 and return the average value of the output phase voltages of the generator 10 to its regulated value.

The manner in which the potential transformer 70 and the current transformers 62, 64 and 66 are interconnected with the magnetic amplifier 60 has several important results. First, since the potential transformer 70 is responsive to the output voltage of the generator 10 and the current transformers 62, 64 and 66 are directly responsive to the output load current of the generator 10 and said transformers are interconnected so as to produce a combined output voltage which is applied to the load windings of the magnetic amplifier 60, the output current of the magnetic amplifier 60 as applied to the field winding 24 of the exciter 20 may be increased without a corresponding change in the output signal of the error detecting circuit 40. The transient performance of the regulating system 30 is therefore improved, and less gain is required in the magnetic amplifier 60 with a resulting improvement in the stability of the regulator system 30. A second important result of the arrangement described is that even if the line conductors 14, 16 and 18 or the load circuit connected thereto at the bus conductors B1, B2 and B3 should become shorted or a fault should occur thereon, thereby reducing the output voltage of the transformer 70 to a negligible value, the current transformers 62, 64 and 66 continue to supply voltage to the load windings of the magnetic amplifier 60 thereby providing field excitation for the generator 10. In other words, sufficient excitation is assured for the generator 10 during short-circuit or fault conditions so that the output current of the generator 10 is sufficient to actuate associated protective equipment, such as breakers, fuses or relays.

The unbalanced voltage detecting circuit or negative sequence voltage sensing circuit 300 is provided in order to prevent excessive excitation from being applied to the generator 10 during short-circuit or fault conditions which would otherwise cause the magnitude of the highest phase voltage at the output terminals 13, 15 and 17 of said generator to exceed a predetermined value. It is to be understood that any suitable type of negative sequence voltage sensing circuit or network may be utilized for the unbalanced voltage detecting circuit 300. The particular negative sequence sensing circuit or unbalanced voltage detecting circuit 300 shown for the purpose of illustration is of the type disclosed and claimed in a patent to R. D. Jessee, No. 2,836,771, issued May 27, 1958. The unbalanced voltage detecting circuit 300 is energized from the three-phase output voltage of the generator 10 at the line conductors 14, 16 and 18 through the transformer means 70. In particular the input of the unbalanced voltage detecting circuit 300 is connected to the tap connections 72A, 74A and 76A of the primary phase windings 72, 74 and 76, respectively, of the transformer 70.

The unbalanced voltage detecting circuit 300 includes a negative sequence filter comprising a resistor 338 and a capacitor 336 connected in series across portions of the primary phase windings 72 and 76 between the tap connections 72A and 76A, respectively, and a capacitor 334 and a resistor 332 connected across portions of the primary phase windings 72 and 74 of the transformer 70 at the tap connections 72A and 74A, respectively. It can be shown as fully described in the above-mentioned patent that when the resistors and the capacitors have the proper values with respect to each other, the vector sum of the voltages across the resistor 332 and the capacitor 336 gives an output voltage proportional to the negative sequence component of the three-phase voltage at the output terminals 13, 15 and 17 of the generator 10 as sensed at the line conductors 14, 16 and 18, respectively. The resultant voltage across the resistor 332 and the capacitor 336 is applied to an isolating transformer 320, which may have a one-to-one ratio. The transformer 320 has its primary winding 324 connected across the capacitor 336 and the resistor 332, as shown, so that the output voltage of the unbalanced voltage detecting circuit 300 appears across the secondary winding 322 of the transformer 320. The resultant output voltage of the unbalanced voltage detecting circuit 300 which appears across the secondary winding 322 of the transformer 320 is applied to the input terminals of a single phase rectifier bridge 310 which gives a direct current or unidirectional current output voltage proportional to or which varies with the negative sequence component of the three-phase output voltage of the generator 10 at the line conductors 14, 16 and 18. The output voltage of the unbalanced voltage detecting circuit 300 which appears at the terminals 311 and 313 of the rectifier 310 is applied to the limiting windings 156 through 166 of the magnetic amplifiers 60 through a filtering circuit which comprises the resistor 302 and the capacitor 304 and a forward poled diode 306. The filtering circuit which comprises the resistor 302 and the capacitor 304 is provided to effectively decouple the operation of the unbalanced voltage detecting circuit 300 from that of the magnetic amplifier 60 by preventing alternating current from the magnetic amplifier 60 from entering and interfering with the operation of the unbalanced voltage detecting circuit 300. The limiting windings 156 through 166 of the magnetic amplifier 60 are effectively connected in series across the output terminals 311 and 313 of the unbalanced voltage detecting circuit 300 and in series with the diode 306. As will be discussed in greater detail hereinafter, the diode 306 prevents current flow in the limiting winding 156 through 166 until the output voltage of the unbalanced voltage detecting circuit increases to or reaches a predetermined value which may be the threshold voltage of the diode 306. It is to be understood that a reversely poled semi-conductor diode, preferably of the type known to the art as a Zener diode, may be substituted for the diode 306 in a particular application. In the latter case, the diode would be of the type which has a predetermined, nondestructive, reverse breakdown characteristic when the voltage applied to said diode in the reverse direction exceeds a predetermined breakdown voltage. In the latter case, current flow through the limiting windings 156 through 166 would be prevented until the output voltage of the unbalanced voltage detecting circuit 300 increased to or reached a predetermined value which exceeded the breakdown voltage of the diode.

The operation of the unbalanced voltage detecting circuit 300 and the effect of said operation on the operation of the regulator system 30 will now be considered. During the normal operation of the generator 10 and the regulator system 30 in the absence of short-circuit or fault conditions at the line conductors 14, 16 and 18 or at the bus conductors B1, B2 and B3, the unbalanced voltage detecting circuit 300 has no effect on the operation of the regulator system 30 which is then responsive only to the average value of the output phase voltages of the generator 10 or responsive to the positive sequence component of said phase voltages. This is because the output voltage of the unbalanced voltage detecting circuit 300 is below a predetermined value, which may be the threshold voltage of the diode 306 or the breakdown voltage of a reversely poled semiconductor diode where employed, and the diode 306 does not permit current flow from the output of the rectifier 310 so long as the output voltage or signal from the unbalanced voltage detecting circuit is below said predetermined value. In other words, the output voltage or signal from the unbalanced voltage detecting circuit 300 is a measure of the degree of unbalance of the output phase voltages of the generator 10 and the diode 306 does not permit current flow in the limiting windings 156 to 166 of the magnetic amplifier 60 until the degree of unbalance of the output phase voltages of the generator 10 has exceeded said predetermined limit. It is important to note that the degree of unbalance of the output phase voltages of the generator 10 and the output voltage of the unbalance voltage detecting circuit 300 varies with the magnitude of the fault current or line current flowing in the line conductors 14, 16 and 18 when a line-to-ground or line-to-line fault occurs on said line conductors or on the bus conductors B1, B2 and B3. The current flow in the limiting windings 156 to 166 of the magnetic amplifier 60 may therefore be arranged to start when the fault current in the line conductors 14, 16 and 18 reaches a predetermined value which may be a percentage of the rated output current of the generator 10 or when the output voltage of the unbalanced voltage detecting circuit 300 reaches a predetermined value which indicates that the output phase voltages of the generator 10 have become unbalanced to a degree in excess of a predetermined limit.

In particular, when a line-to-ground fault or line-to-line fault occurs at the line conductors 14, 16 and 18 and the corresponding current flow in said conductors increases to a predetermined value which corresponds to a predetermined degree of unbalance of the output phase voltages of the generator 10, the output voltage of the unbalance voltage detecting circuit 300 will increase to a predetermined value in excess of the threshold voltage of the diode 306. During short-circuit or fault conditions when the output voltage of the unbalanced voltage detecting circuit 300 increases to a value in excess of the threshold voltage of the diode 306, current will flow from the positive terminal of the rectifier 310, through the resistor 302, through the limiting windings 156 through 166 of the magnetic amplifier 60 and through the diode 306 to the negative terminal 311 of the unbalanced voltage detecting circuit 300. The flux produced by the current flow through the limiting windings 156, 158, 160, 162, 164 and 166 in the core members 120, 122, 124, 126, 128 and 130, respectively, will oppose the flux produced by the current flow in the associated control windings 170, 172, 174, 176, 178 and 180, respectively, and prevent any further increase in the output current of the magnetic amplifier 60 and in turn prevent any further increase in the excitation current applied to the field winding 12 of the generator 10 during short-circuit or fault conditions when the operation of the regulator system 30 would otherwise be to increase said excitation current.

In other words, the effect of the operation unbalanced voltage detecting circuit 300 on the operation of the regulator system 30 is to reduce the excitation current supplied by said regulator system to the field winding 12 of the generator 10 after the fault current in the line conductors 14, 16 and 18 reaches a predetermined value during short-circuit or fault conditions or after the corresponding degree of unbalance of the output phase voltages of the generator 10 has exceeded a predetermined limit. After the output phase voltages of the generator 10 have become unbalanced to a degree in excess of a predetermined limit during short-circuit or fault conditions at the line conductors 14, 16 and 18, the magnetic amplifier 60 is then responsive to both the average value of the output phase voltages of the generator 10 as sensed by the error detecting circuit 40 and to the negative sequence voltage component of said phase voltages as sensed by the unbalanced voltage detecting circuit 300 to prevent the highest phase voltage of the generator 10 from exceeding a predetermined value.

The effect of the operation of the unbalanced voltage detecting circuit 300 on the regulator system 30 can be more clearly understood by comparing the curves of FIG. 2 with the curves of FIG. 3. The curves 410, 420, and 430 represent three typical output phase voltages of the generator 10 as a function of increasing fault current when the regulator system 30 is responsive only to the average value of the output phase voltages of the generator 10 in the absence of the unbalanced voltage detecting circuit 300. The manner in which the three output phase voltages of the generator 10 may become unbalanced during fault conditions in the absence of the unbalanced voltage detecting circuit 300 is illustrated. For example, the voltage on one phase as represented by the curve 410 may increase to an excessive value while the voltage on a second phase remains near the rated output voltage of the generator 10, as represented by the curve 420. The voltage on the third phase, on which a fault has occurred, as represented by the curve 430 decreases to a relatively low value as the fault current increases. It is to be noted that the load connected to the phase on which an excessive phase voltage results, as represented by the curve 410, is subject to damage due to the excessive applied phase voltage.

On the other hand, the effect of the unbalanced voltage detecting circuit 300 in limiting or suppressing the highest phase voltage at the output of the generator 10 during fault conditions is shown in FIG. 3 in which the phase voltages in the latter case corresponding to the phase voltages represented by the curves 410, 420 and 430 in FIG. 2, are represented by the curves 510, 520 and 530, respectively. It is to be noted that while the phase voltages represented by the curves 520 and 530 remain substantially unchanged from the phase voltages represented by the corresponding curves 420 and 430, respectively, the highest phase voltage as represented by the curve 510 is limited to a magnitude below a predetermined value as indicated by the straight line curve 540. The damage which would otherwise result from the application of an excessive highest phase voltage to the load connected to the latter phase is prevented by the operation of the unbalanced voltage detecting circuit 300 after the degree of unbalance of the output phase voltages of the generator 10 has exceeded a predetermined limit or the corresponding fault current in the line conductors 14, 16 and 18 has exceeded a predetermined value.

The effect of the operation of the unbalance voltage detecting circuit 300 on the regulator system 30 may also be represented graphically as shown in FIG. 4. The curve 610 represents the magnitude of the highest phase voltage permitted by the operation of the regulator system 30, as modified by the operation of the unbalanced voltage detecting circuit 300 as a function of unbalanced line current or fault current in the line conductors 14, 16 and 18. It is to be noted that the unbalanced voltage detecting circuit 300 permits the regulator system 30 to increase the magnitude of the highest phase voltage to a predetermined value until the degree of unbalance of the output phase voltages of the generator 10 has exceeded a predetermined limit or until the unbalanced line current in the line conductors 14, 16 and 18 has exceeded a predetermined value as indicated at 650 in FIG. 4. The curve 630 represents the output voltage or signal of the unbalanced voltage detecting circuit 300, which includes means for blocking or biasing the output of said circuit until the degree of unbalance of the output phase voltages of the generator 10 has increased above a predetermined limit or the unbalanced line current or fault current in the line conductors 14, 16 and 18 has exceeded a predetermined value, as indicated at 650. The latter means included in the unbalanced voltage detecting circuit 300 is illustrated as comprising the diode 306. The curve 640 represents the reference level or voltage established in the regulator system 30 by the operation of the error detecting circuit 40. The curve 620 represents the average value of the output phase voltages of the generator 10 or the positive sequence component of said phase voltages as sensed by the error detecting circuit 40. When a line-to-ground fault or line-to-line fault occurs at the line conductors 14, 16 and 18, the average value of the output phase voltages of the generator 10 decreases as the unbalanced line current or fault current increases, as shown by the curve 620 of FIG. 4. The difference between the average value of the output phase voltages of the generator 10 and the reference level of the error detecting circuit 40 as represented by the curves 620 and 640, respectively, appears at the output terminals of the error detecting circuit 40. In the absence of the unbalance voltage detecting circuit 300, the latter error signal or voltage would cause the excitation supplied to the generator 10 by the magnetic amplifiers 60 to increase and cause the highest phase voltage at the line conductors 14, 16 and 18 to correspondingly increase to an excessive value. As discussed previously, the limiting or offsetting action of the output voltage or signal from the unbalanced voltage detecting circuit 300, as represented by the curve 630 in FIG. 4, is to oppose the effect of the increasing error signal, as represented by the curve 620 in FIG. 4, on the magnetic amplifier 60 when a line-to-ground fault or line-to-line fault occurs at the line conductors 14, 16 and 18. As also mentioned previously, the latter limiting action is only effective when the output of the unbalanced voltage detecting circuit 300 exceeds a predetermined value and is not effective during the normal operation of the regulator system 30 when the output voltage of the unbalanced voltage detecting circuit is below said predetermined value.

Referring again to FIG. 1, the regulator system 30 as disclosed also readily lends itself to use with conventional means for controlling reactive load division when the generator 10 is operating in parallel with other similar units which are also connected to the bus conductors B1, B2 and B3. For example, assume that a second generator and its associated regulator system are connected to the bus conductors B1, B2 and B3, as indicated at 350 in FIG. 1. A conventional reactive load division circuit 250 may then be provided for controlling the reactive load division between the generator 10 and the second generator connected to the bus conductors B1, B2 and B3, as indicated at 350. The particular reactive load division circuit 250 shown for the purpose of illustration is of the type disclosed in a patent to R. H. Keith et al., No. 2,717,318 issued September 6, 1955.

The reactive load division circuit 250 comprises a current transformer 26 for each of the generators operating in parallel. Each of the current transformers 26 is energized by the output current of the associated generator and the secondaries of said current transformers are connected in a loop circuit by the conductors 27 and 29. A mutual reactor 93 is provided for each regulator system with a first winding 98 connected to the loop circuit which joins the current transformers and a second winding 95 connected between the line conductor 18 and the error detecting circuit 40. It can be shown, as more fully described in the above-mentioned patent, that when both generators are supplying equal reactive currents, the secondary currents of the current transformers 26 circulate in the loop circuit and no current passes through either of the mutual reactors associated with said generators. If one machine however, attempts to supply more current than the other, a current proportional to the difference in the load currents of the generators flows through the mutual reactors 93. The phase relations between the voltage across the mutual reactor 95 and the line voltage are such that the resultant voltage applied to the error detecting circuit 40 is not affected by differences in kilowatt load but is affected by voltages due to differences in reactive load.

It is to be understood that one or more additional magnetic amplifiers may be employed in a particular application in accordance with the teachings of the invention as disclosed. It should also be noted that the teachings of the invention may be employed in excitation systems which do not include a separate rotating exciter, such as the exciter 20 shown in FIG. 1 of the drawings, but instead the excitation current may be supplied directly to the field winding 12 of the generator 10. It is also clear that the teachings of the invention may also be applied in similar types of excitation systems in which the excitation is obtained from means which are responsive to both the output current and to the output voltage of a dynamoelectric machine, such as a synchronous generator. For example, instead of employing a regulator system of the magnetic amplifier type as used to illustrate the invention, the excitation may be controlled by regulator systems employing electronic tubes or semiconductor devices, such as transistors, and the unbalanced voltage detecting circuit as disclosed may be employed to limit the excitation supplied during certain operating conditions. It is also to be understood that other types of semiconductor devices having a reverse volt-ampere breakdown characteristic, which may or may not be controllable, such as double-base diodes, may be substituted for the diode 306 as disclosed. It is to be noted that frequency compensating means may also be added to the unbalanced voltage detecting circuit 300 as disclosed in detail in U.S. Patent 2,836,771 previously mentioned. It is also clear that zero sequence voltage sensing could be added to the negative sequence voltage sensing and the positive sequence voltage sensing to which the magnetic amplifier 60 is responsive during certain operating conditions as disclosed, similarly to the over-all voltage sensing circuit disclosed in copending appliation Serial No. 768,912, now abandoned which was filed October 10, 1958 by R. D. Jessee and G. H. Stearley and assigned to the same assignee as the present application. It should also be noted that zero sequence sensing could be substituted for negative sequence sensing in a regulator system, as disclosed, in certain applications. It is also important to note that a regulator system as disclosed could be employed to control the operation of other conventional voltage controlling means used with alternating current polyphase circuits, such as tap-changing transformer means and similar equipment.

The apparatus embodying the teachings of this invention has several advantages. For example, a regulator system as disclosed maintains the average value of the phase voltages of an alternating current circuit at a predetermined value for all balanced load currents and for unbalanced load currents below a predetermined value or for unbalanced phase voltages which are unbalanced to a degree below a predetermined limit. When a line-to-ground fault or a line-to-line fault occurs on the associated alternating current circuit, a regulator system, as disclosed, limits or suppresses the highest phase voltage to a predetermined value when the unbalanced line current exceeds a predetermined value or when the degree of unbalance of the phase voltages exceed a predetermined limit. In other words, a regulator system, as disclosed, is prevented by the operation of the unbalanced voltage detecting circuit from maintaining the average value of the phase voltages of said circuit at substantially a predetermined value during certain operating conditions previously discussed.

Since numerous changes may be made in the above described apparatus and circuits and different embodiments of the invention may be made without departing from the spirit and scope thereof, it is intended that all the matter contained in the foregoing description or shown in the accompanying drawing shall be interpreted as illustrative and not in a limiting sense.

We claim as our invention:

1. Voltage controlling means for a polyphase alternating current circuit comprising first means for obtaining a signal which varies with the negative sequence voltage of said circuit, second means for biasing the output of said voltage sensing means to a negligible value until said signal reaches a predetermined value, said second means comprising a forward poled diode having a predetermined threshold voltage and third means responsive to said first and second means for preventing the voltage controlling means from increasing the voltage of said circuit when said signal exceeds said predetermined value.

2. Voltage controlling means for a polyphase alternating current circuit comprising first means for obtaining a signal which varies with the negative sequence voltage of said circuit, second means for biasing the output of said voltage sensing means to a negligible value until said signal reaches a predetermined value, said second means comprising a reversely poled semiconductor diode having a predetermined reverse breakdown characteristic and magnetic amplifier means responsive to said first and second means for preventing the voltage controlling means from increasing the voltage of said circuit when the line current of said circuit exceeds a predetermined value.

3. Voltage controlling means for a polyphase alternating current circuit comprising first means for obtaining a first signal which varies with the negative sequence voltage of said circuit, second means for biasing the output of said first means to a negligible value until the line current of said circuit reach a predetermined value, said second means comprising a diode having a predetermined threshold voltage, third means for obtaining a second signal which varies with the positive sequence voltage of said circuit and control means for controlling the voltage of said circuit responsive to the combined outputs of said first and second means, said control means including a magnetic amplifier.

4. In a regulator system for a polyphase dynamoelectric machine having an excitation field winding and output terminals, the combination comprising, first means connected in circuit relation with said output terminals for obtaining an error signal which is a measure of the deviation of the output voltage of said machine from a predetermined regulated value, amplifying means connected in circuit relation with said field winding for controlling the excitation supplied thereto, said amplifying means being responsive to said error signal to maintain the output voltage of said machine at substantially said predetermined value, first circuit means connected in circuit relation with said output terminals for obtaining an output control signal which is a measure of the negative sequence component of the output phase voltages of said machine, and second circuit means connected between said amplifying means and said first circuit means for applying said control signal to said amplifying means to reduce the excitation current supplied to said field winding when said control signal exceeds a predetermined value, said second circuit means comprising a diode.

5. In a regulator system for a polyphase dynamoelectric machine having an excitation field winding and output terminals, the combination comprising, first means connected in circuit relation with said output terminals for obtaining an error signal which is a measure of the deviation of the output voltage of said machine from a predetermined regulated value, second means connected in circuit relation with said field winding for controlling the excitation supplied thereto, said second means comprising a magnetic amplifier which is normally responsive to said error signal to maintain the output voltage of said machine at substantially said predetermined value, third means connected in circuit relation with said output terminals for obtaining an output control signal which is a measure of the degree of unbalance of the output phase voltages of said machine, and fourth means connected between said second means and said third means for applying said control signal to said second means to reduce the excitation current supplied to said field winding when the output current of said machine exceeds a predetermined value, said fourth means comprising a diode which conducts to a much greater degree when said control signal exceeds said predetermined value.

6. In a regulator system for a polyphase dynamoelectric machine having an excitation field winding and output terminals, the combination comprising, first means connected in circuit relation with said output terminals for obtaining an error signal which is a measure of the deviation of the output voltage of said machine from a predetermined regulated value, magnetic amplifier means connected in circuit relation with said field winding for controlling the excitation supplied thereto, said magnetic amplifier means being responsive to said error signal to maintain the output voltage of said machine at substantially said predetermined value, second means connected in circuit relation with said output terminals for obtaining an output control signal which is a measure of the unbalance of the output phase voltages of said machine, and third means connected between said magnetic amplifier means and said second means for applying said control signal to said magnetic amplifier means to reduce the excitation current supplied to said field winding when said control signal exceeds a predetermined value, said third means comprising a forward poled diode having a predetermined threshold voltage.

7. In a regulator system for a polyphase dynamoelectric machine having an excitation field winding and output terminals, the combination comprising, first means connected in circuit relation with said output terminals for obtaining an error signal which is a measure of the deviation of the average value of the output phase voltages of said machine from a predetermined regulated value, magnetic amplifier means connected in circuit relation with said field winding for controlling the excitation supplied thereto, said magnetic amplifier means being responsive to said error signal to maintain the average value of the output phase voltages of said machine at substantially said predetermined value, second means connected in circuit relation with said output terminals for obtaining an output control signal which is a measure of the unbalance of the output phase voltages of said machine, and third means connected between said magnetic amplifier means and said second means for applying said control signal to said magnetic amplifier means to reduce the excitation current supplied to said field winding when the output current of said machine exceeds a predetermined value, said third means comprising a reversely poled semiconductor diode having a predetermined reverse breakdown characteristic.

8. In a regulator system for a polyphase dynamoelectric machine having an excitation field winding and output terminals, the combination comprising, first means connected in circuit relation with said output terminals for obtaining an error signal which is a measure of the deviation of the average value of the output phase voltages of said machine from a predetermined regulated value, amplifying means connected in circuit relation with said field winding for controlling the excitation supplied thereto, said amplifying means being responsive to said error signal to maintain the average value of the output phase voltages of said machine at substantially said predetermined value, first circuit means connected in circuit relation with said output terminals for obtaining an output control signal which is a measure of the negative sequence component of the output phase voltages of said machine, and second circuit means connected between said amplifying means and said first circuit means for applying said control signal to said amplifying means to reduce the excitation current supplied to said field winding when said control signal exceeds a predetermined value, said second circuit means comprising a reversely poled semiconductor diode having a predetermined reverse breakdown characteristic.

9. In a regulator system for a polyphase dynamoelectric machine having an excitation field winding and output terminals, the combination comprising, first means connected in circuit relation with said output terminals for obtaining an error signal which is a measure of the deviation of the average value of the output phase voltages of said machine from a predetermined regulated value, magnetic amplifier means connected in circuit relation with said field winding for controlling the excitation supplied thereto, said magnetic amplifier means being responsive to said error signal to maintain the average value of the output phase voltages of said machine at substantially said predetermined value, first circuit means connected in circuit relation with said output terminals for obtaining an output control signal which is a measure of the zero sequence component of the output phase voltages of said machine, and second circuit means connected between said magnetic amplifier means and said first circuit means for applying said control signal to said magnetic amplifier means to reduce the excitation current supplied to said field winding when said control signal exceeds a predetermined value, said second circuit means comprising a forward connected diode having a predetermined threshold voltage associated therewith.

References Cited in the file of this patent

UNITED STATES PATENTS

| | | |
|---|---|---|
| 2,161,829 | Lenehan | Jan. 13, 1939 |
| 2,858,457 | Epstein | Oct. 28, 1958 |
| 2,862,173 | Bobo et al. | Nov. 25, 1958 |